US011023022B2

(12) United States Patent
Yang et al.

(10) Patent No.: US 11,023,022 B2
(45) Date of Patent: Jun. 1, 2021

(54) APPARATUS AND METHOD FOR IMPROVING THERMAL CYCLING RELIABILITY OF MULTICORE MICROPROCESSOR

(71) Applicant: AJOU UNIVERSITY INDUSTRY-ACADEMIC COOPERATION FOUNDATION, Suwon-si (KR)

(72) Inventors: Hoeseok Yang, Suwon-si (KR); Beomsik Kim, Cheonan-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 16/751,327

(22) Filed: Jan. 24, 2020

(65) Prior Publication Data

US 2020/0379527 A1 Dec. 3, 2020

(30) Foreign Application Priority Data

May 31, 2019 (KR) .......................... 10-2019-0064663

(51) Int. Cl.
*G06F 1/32* (2019.01)
*G06F 1/20* (2006.01)
(Continued)

(52) U.S. Cl.
CPC .............. *G06F 1/206* (2013.01); *G06F 1/203* (2013.01); *G06F 1/3206* (2013.01); *G06F 1/3243* (2013.01)

(58) Field of Classification Search
CPC combination set(s) only.
See application file for complete search history.

(56) References Cited

U.S. PATENT DOCUMENTS

2009/0100437 A1\* 4/2009 Coskun ................. G06F 9/5094
718/105
2009/0271141 A1\* 10/2009 Coskun ................... G06F 1/206
702/132

(Continued)

FOREIGN PATENT DOCUMENTS

| KR | 10-1700567 B1 | 2/2017 |
| KR | 10-1755817 B1 | 7/2017 |
| KR | 10-1813435 B1 | 12/2017 |

OTHER PUBLICATIONS

Yue et al. Improving System-Level Lifetime Reliability of Multicore Soft Real-Time Systems. IEEE, Mar. 10, 2017 (Year: 2017).*

(Continued)

*Primary Examiner* — Zahid Choudhury
(74) *Attorney, Agent, or Firm* — Sughrue Mion, PLLC

(57) ABSTRACT

The present disclosure relates to an apparatus and method for improving thermal cycling reliability of a multicore microprocessor, and a method for a method for improving thermal cycling reliability of a multicore microprocessor according to an embodiment of the present disclosure includes determining an optimal temperature of a microprocessor to maximize a mean time to failure of the microprocessor, and increasing at least one of an operating frequency of the microprocessor or a processor utilization of the microprocessor to make a temperature of the microprocessor equal to or higher than the optimal temperature.

14 Claims, 12 Drawing Sheets

(51) Int. Cl.
*G06F 1/3206* (2019.01)
*G06F 1/3234* (2019.01)

(56) References Cited

U.S. PATENT DOCUMENTS

| | | | | |
|---|---|---|---|---|
| 2012/0036398 | A1* | 2/2012 | Moyer | G06F 9/505 |
| | | | | 714/48 |
| 2014/0379998 | A1* | 12/2014 | Hughes | G06F 12/0817 |
| | | | | 711/146 |
| 2015/0046604 | A1* | 2/2015 | Park | G06F 3/00 |
| | | | | 710/3 |
| 2016/0252943 | A1* | 9/2016 | Varma | G06F 9/45541 |
| | | | | 713/310 |
| 2017/0269651 | A1* | 9/2017 | Huang | G06F 1/329 |
| 2020/0042056 | A1* | 2/2020 | Shabbir | H05K 7/20209 |
| 2020/0379527 | A1* | 12/2020 | Yang | G06F 1/206 |

OTHER PUBLICATIONS

Y. Xiang et al. System-level reliability modeling for MPSoCs. IEEE/ACM/IFIP, Oct. 2010 (Year: 2010).*

Beomsik Kim et al., "Thermal Cycling Aware Reliability Improvement for Satellite Payload Embedded Software", Proceedings of Symposium of the Korean Institute of communications and Information Sciences, 2019.1, pp. 1510-1511.

* cited by examiner

*FIG.4A*

| Frequency (GHz) | $P_{act}(f)$ | $P_{oth}(f)$ |
|---|---|---|
| 1.24 | 0.14648 | 2.24609 |
| 1.33 | 0.19124 | 2.26847 |
| 1.43 | 0.22108 | 2.31595 |
| 1.53 | 0.23600 | 2.38851 |
| 1.63 | 0.26991 | 2.48684 |
| 1.73 | 0.37164 | 2.51329 |
| 1.84 | 0.46251 | 2.54245 |
| 1.94 | 0.53033 | 2.56822 |
| 2.01 | 0.59001 | 2.58993 |
| 2.12 | 0.69851 | 2.61163 |
| 2.22 | 0.86806 | 2.61502 |
| 2.32 | 1.11626 | 2.64147 |

APPARATUS AND METHOD FOR IMPROVING THERMAL CYCLING RELIABILITY OF MULTICORE MICROPROCESSOR

CROSS-REFERENCE TO RELATED APPLICATION

This application claims the benefit of Korean Patent Application No. 10-2019-0064663 filed on May 31, 2019, the disclosures of which are incorporated herein by reference.

TECHNICAL FIELD

The present disclosure relates to an apparatus and method for improving thermal cycling reliability of a multicore microprocessor.

BACKGROUND

Satellite payloads, such as satellites, are operated in space and thus exposed to environments that vary greatly in ambient temperature. It is necessary to maintain an appropriate operating temperature to operate a satellite payload normally and suppress a failure of the satellite payload in these environments.

Also, the satellite payload needs to be guaranteed with long operating time without maintenance. Therefore, it is important to design the satellite payload to have high stability. Accordingly, the satellite payload has a regular cycle of temperature change for each orbit.

Electromigration (EM), Time-Dependent Dielectric Breakdown (TDDB), Stress Migration (SM), Thermal Cycling (TC) and the like can be considered as temperature-related failure mechanisms in a semiconductor system including a microprocessor. Particularly, EM, TDDB and SM are heavily dependent on the maximum temperature (peak temperature) of a semiconductor and show a tendency of decrease in life of the system as the maximum temperature increases. However, as to Thermal Cycling (TC), the life of the system is determined with consideration for the amplitude and cycle of TC as well as the maximum temperature (peak temperature) of a semiconductor. Particularly, as to TC, wear caused by thermal stress that is generated when adjacent materials have different coefficients of thermal expansion is a key factor in determining the life of the system.

Conventionally, there has been suggested a method for improving the stability of a system by determining the optimal monitoring cycle in a multicore microprocessor and the optimal processor utilization for each cycle and satisfying the real-time limitations to reduce thermal cycling. However, this method is limited in that ambient temperature is assumed to be maintained constantly. Therefore, it is difficult to apply this method to a system, such as a satellite, operated in environments that vary greatly in ambient temperature.

Further, most of conventional temperature control methods are about reducing the maximum temperature (peak temperature) of a microprocessor chip, and such a method of reducing the maximum temperature (peak temperature) cannot be used to reduce damage related to the above-described thermal cycling (TC). Therefore, it has been difficult to achieve a desired level of improvement in system life.

Meanwhile, thermal control techniques applied to satellite payloads such as satellites can be roughly classified into two categories. One is an active thermal control system that consumes power and may include, e.g., Thermal Straps, Heater, Cryocooler and the like. The other is a passive thermal control system that does not consume power and may include, e.g., Multi-Layer Insulation (MLI), Thermal Coating, Sun Shields, Louver, Radiator, Heat Pipe and the like. As to the active thermal control system, considerable weight, size and cost are required to implement the active thermal control system in a satellite payload. As to the passive thermal control system, it is difficult to precisely control temperature. In this regard, although a small-size satellite such as a cube satellite is gradually increasing in demand, it is still difficult to utilize the conventional thermal control systems due to great limitations of power, weight, size, cost and the like.

The background technology of the present disclosure is disclosed in Korean Patent No. 10-1755817.

SUMMARY

In view of the foregoing, the present disclosure provides an apparatus and method for improving thermal cycling reliability of a multicore microprocessor capable of improving the stability of a system with a built-in microprocessor chip by reducing the thermal cycling amplitude of a microprocessor in an environment that varies greatly in temperature.

In view of the foregoing, the present disclosure is provided to determine an optimal temperature profile for a microprocessor to reduce the thermal cycling amplitude of the microprocessor and intentionally increase the frequency of each core of the microprocessor or inject (assign) a virtual task (workload) to each core in order to control the microprocessor to be operated in accordance with the determined optimal temperature profile.

In view of the foregoing, the present disclosure provides an apparatus and method for improving thermal cycling reliability that can be applied to a small-size satellite such as a cube satellite in which it is difficult to utilize a conventional thermal control system.

However, the problems to be solved by the present disclosure are not limited to the above-described problems. There may be other problems to be solved by the present disclosure.

According to an embodiment of the present disclosure, there is provided a method for improving thermal cycling reliability of a multicore microprocessor, including determining an optimal temperature of a microprocessor to maximize a mean time to failure of the microprocessor, and increasing at least one of an operating frequency of the microprocessor or a processor utilization of the microprocessor to make a temperature of the microprocessor equal to or higher than the optimal temperature.

Also, according to an embodiment of the present disclosure, there is provided a method for improving thermal cycling reliability of a multicore microprocessor, including acquiring a next task set including multiple tasks to be performed in a microprocessor, determining a next mapping policy that minimizes a temperature standard deviation between cores of the microprocessor based on the next task set, calculating an initial temperature of the microprocessor based on the determined next mapping policy, determining an optimal temperature profile for the microprocessor based on the initial temperature and a minimum operating temperature and a maximum operating temperature of the microprocessor, and adjusting at least one of an operating frequency for each core of the microprocessor or a processor utilization of the microprocessor to make a difference between the optimal temperature profile and a temperature of the microprocessor equal to or lower than a predetermined threshold value.

Further, the next mapping policy may include assignment policy information by which each of the multiple tasks is assigned to each core and next operating frequency information for each core that will perform an assigned task.

Furthermore, the determining of the next mapping policy may include (a) assigning any one of the multiple tasks to any one of multiple cores, (b) determining the next operating frequency information for the core that has been assigned the any one task based on a real-time limitation and a power minimization condition, (c) calculating temperatures of all the cores, (d) calculating a temperature standard deviation between cores based on the calculated temperatures of all the cores, (e) repeating the processes (a) to (d) with respect to the other cores among the multiple cores for the any one task, and (f) determining the assignment policy information in order for a core that minimizes the temperature standard deviation between cores to perform the any one task.

Moreover, the determining of the next mapping policy may be performed repeatedly until the assignment policy information for all of the multiple tasks and the next operating frequency information for all of the cores are determined.

Besides, the determining of the next mapping policy may be performed repeatedly from a task with the longest execution time to a task with the shortest execution time among the multiple tasks.

Further, the determining of the optimal temperature profile may include determining a minimum temperature profile based on the minimum operating temperature and the initial temperature, determining a maximum temperature profile based on the maximum operating temperature and the initial temperature, estimating a mean time to failure of the microprocessor in the minimum temperature profile and the maximum temperature profile, and determining the optimal temperature profile within a range between the minimum temperature profile and the maximum temperature profile based on the mean time to failure.

Furthermore, in the estimating of the mean time to failure, the mean time to failure may be estimated based on a Monte Carlo simulator.

Moreover, the adjusting of at least one of the operating frequency for each core of the microprocessor or the processor utilization of the microprocessor may include calculating the difference between the optimal temperature profile and the temperature of the microprocessor, and increasing at least one of the operating frequency for each core of the microprocessor or the processor utilization of the microprocessor when the difference in temperature is higher than the predetermined threshold value.

Besides, in the increasing of at least one of the operating frequency for each core of the microprocessor or the processor utilization of the microprocessor, a virtual task may be assigned to a core that is to increase the processor utilization to increase the processor utilization of the microprocessor.

Further, the microprocessor and a printed circuit board on which the microprocessor is mounted may be provided in a system with a built-in satellite payload.

Also, according to an embodiment of the present disclosure, there is provided an apparatus for improving thermal cycling reliability of a multicore microprocessor, including an initial mapping unit that determines a next mapping policy for multiple tasks to be performed in a microprocessor and outputs an initial temperature of the microprocessor based on the next mapping policy, an optimal profile search unit that determines an optimal temperature profile based on the initial temperature and a minimum operating temperature and a maximum operating temperature of the microprocessor, and a runtime mapping unit that adjusts at least one of an operating frequency for each core of the microprocessor or a processor utilization of the microprocessor based on a difference between the optimal temperature profile and a temperature of the microprocessor.

Further, the next mapping policy may include assignment policy information by which each of the multiple tasks is assigned to each core and next operating frequency information for each core that will perform an assigned task.

Furthermore, the initial mapping unit may perform (a) assigning any one of the multiple tasks to any one of multiple cores, (b) determining the next operating frequency information for the core that has been assigned the any one task based on a real-time limitation and a power minimization condition, (c) calculating temperatures of all the cores, (d) calculating a temperature standard deviation between cores based on the calculated temperatures of all the cores, (e) repeating the processes (a) to (d) with respect to the other cores among the multiple cores for the any one task, (f) determining the assignment policy information in order for a core that minimizes the temperature standard deviation between cores to perform the any one task, and (g) repeating the processes (a) to (f) until the assignment policy information for all of the multiple tasks and the next operating frequency information for all of the cores are determined.

Moreover, the optimal profile search unit may include a profile range determination unit that determines a minimum temperature profile based on the minimum operating temperature and the initial temperature and determines a maximum temperature profile based on the maximum operating temperature and the initial temperature and a mean life calculation unit that determines the optimal temperature profile within a range between the minimum temperature profile and the maximum temperature profile based on a mean time to failure.

Further, the runtime mapping unit may calculate the difference between the optimal temperature profile and the temperature of the microprocessor and increase at least one of the operating frequency for each core of the microprocessor or the processor utilization of the microprocessor when the difference in temperature is higher than a predetermined threshold value.

The above-described aspects are provided by way of illustration only and should not be construed as liming the present disclosure. Besides the above-described embodiments, there may be additional embodiments described in the accompanying drawings and the detailed description.

According to the above-described embodiments of the present disclosure, it is possible to improve the stability of a system with a built-in microprocessor chip by reducing the thermal cycling amplitude of a microprocessor in an environment that varies greatly in temperature.

According to the above-described embodiments of the present disclosure, it is possible to determine an optimal temperature profile for a microprocessor to reduce the thermal cycling amplitude of the microprocessor and intentionally increase the frequency of each core of the microprocessor or inject (assign) a virtual task (workload) to each core in order to control the microprocessor to be operated in accordance with the determined optimal temperature profile.

According to the above-described embodiments of the present disclosure, it is possible to improve the stability of a system such as a satellite payload which cannot be subject to continuous maintenance or improvement and needs to be operated for a long time without a failure.

According to the above-described embodiments of the present disclosure, it is possible to reduce damage caused by thermal cycling by applying the present disclosure to a small-size satellite such as a cube satellite in which it is difficult to utilize a conventional thermal control system.

However, the effects to be obtained by the present disclosure are not limited to the above-described effects. There may be other effects to be obtained by the present disclosure.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

FIG. 4A shows an example of a power consumption look up table depending on an operating frequency of a microprocessor according to an embodiment of the present disclosure.

DETAILED DESCRIPTION

Figure 1:
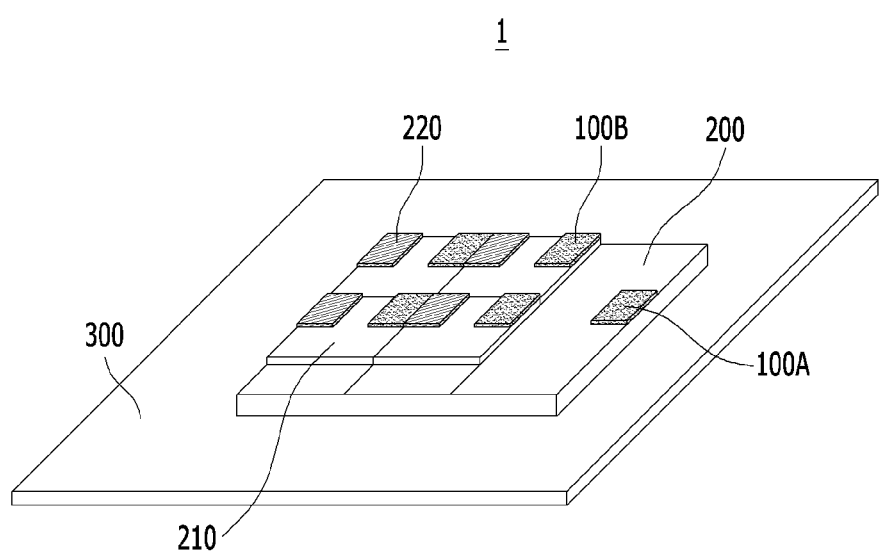
FIG. 1 is a diagram illustrating the configuration of a microprocessor system including an apparatus for improving thermal cycling reliability of a multicore microprocessor according to an embodiment of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" or "indirectly connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a diagram illustrating the configuration of a microprocessor system including an apparatus for improving thermal cycling reliability of a multicore microprocessor according to an embodiment of the present disclosure.

Referring to FIG. 1, a microprocessor system 1 according to an embodiment of the present disclosure may include an apparatus for improving thermal cycling reliability of a multicore microprocessor 100 (hereinafter, referred to as "thermal cycling reliability improving apparatus 100"), a microprocessor 200 and a printed circuit board 300. Herein, the microprocessor 200 may include multiple cores 210 and temperature sensors 220 corresponding to the respective cores 210. For example, referring to FIG. 1, the microprocessor 200 may include four cores 210.

Further, referring to FIG. 1, the thermal cycling reliability improving apparatus 100 according to an embodiment of the present disclosure may be provided as a single device 100A for the microprocessor 200, but may not be limited thereto and may be provided as multiple devices 100B for the multiple cores 210 of the microprocessor 200. In some embodiments, the thermal cycling reliability improving apparatus 100 may be provided for the microprocessor 200 and also provided as multiple devices for the respective multiple cores 210.

Furthermore, according to an embodiment of the present disclosure, the single thermal cycling reliability improving apparatus 100A provided for the microprocessor 200 may be operated as a task mapping controller that assigns a task to each core, and the multiple thermal cycling reliability improving apparatuses 100B provided for the respective multiple cores 210 may be separately operated as a frequency controller (governor) that controls an operating frequency of each core.

The printed circuit board 300 may refer to a substrate on which the microprocessor 200 is mounted and which includes a conductor circuit on or in an insulating substrate to connect a component of the microprocessor 200 depending on the circuit design. The printed circuit board 300 mounts and supports one or more electronic components thereon and electrically connects the one or more electronic components to each other.

The above-described roles and functions of the microprocessor 200 and the printed circuit board 300 are obvious to a person with ordinary skill in the art. Therefore, a detailed description thereof will be omitted.

Also, according to an embodiment of the present disclosure, the microprocessor 200 and the printed circuit board 300 on which the microprocessor 200 is mounted may be provided in a system with a built-in satellite payload. In this case, the above-described microprocessor system 1 can be understood as a system included in the system with a built-in satellite payload or they can be understood as one in the same.

In general, a heating RC-circuit modeling and analysis is used to analyze the result of heating depending on power consumption by a microprocessor. Hereinafter, a heating RC-circuit model used in the present disclosure and an analysis method using the same will be described with reference to FIG. 2 to FIG. 4.

Figure 2:
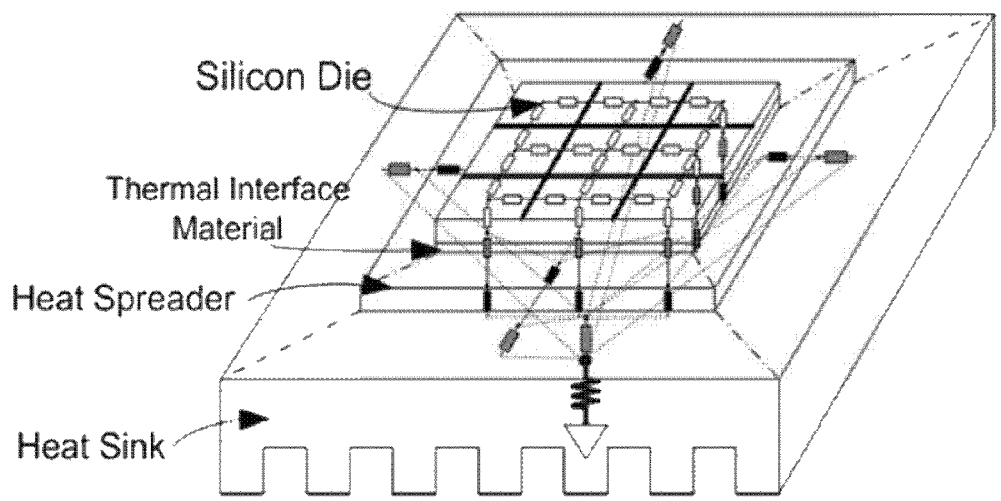
FIG. 2 is a diagram provided to explain a conventional heating RC-circuit model.

FIG. 2 is a diagram provided to explain a conventional heating RC-circuit model. The conventional heating RC-circuit model based on a heating circuit illustrated in FIG. 2 can perform modeling using a duality between electrical phenomena and heat transfer.

Specifically, if n number of components are analyzed at k discrete times through the heating RC-circuit model, power consumed by the n number of components at a kth time can be represented by a vector $p_k$ of length n.

In this case, if $t_k$ is temperature vector of length n and G and C are thermal conductance and thermal capacitance matrices of n×n, respectively, heating of each component can be represented by a differential equation as shown in the following Equation 1.

$$C\dot{t}_k = -Gt_k + p_k, k=1, \ldots m \quad \text{[Equation 1]}$$

Equation 1 can be represented by the following Equation 2-1 and Equation 2-2 with a time interval difference δ between k and k+1 and a unit matrix 1.

$$t_{k+1} = A(t_k)t_k + Bp_k, k=1, \ldots m \quad \text{[Equation 2-1]}$$

$$A(t_k) = (I - \delta C^{-1}G) B = \delta C^{-1} \quad \text{[Equation 2-2]}$$

Herein, a steady state temperature at which the same amount of power is stably consumed can be represented by $t_{ss}$, and this can be calculated by obtaining the solution of the differential equation $\dot{t}=0$.

However, when the conventional heating RC-circuit model illustrated in FIG. 2 is used for analysis, it takes a lot of time to achieve the result of heating depending on power consumption by a microprocessor.

Therefore, the thermal cycling reliability improving apparatus 100 according to an embodiment of the present disclosure can use a RC model, which is simplified from the above-described conventional heating RC-circuit model, to analyze the result of heating depending on power consumption by the microprocessor 200 at high speed.

Figure 3:
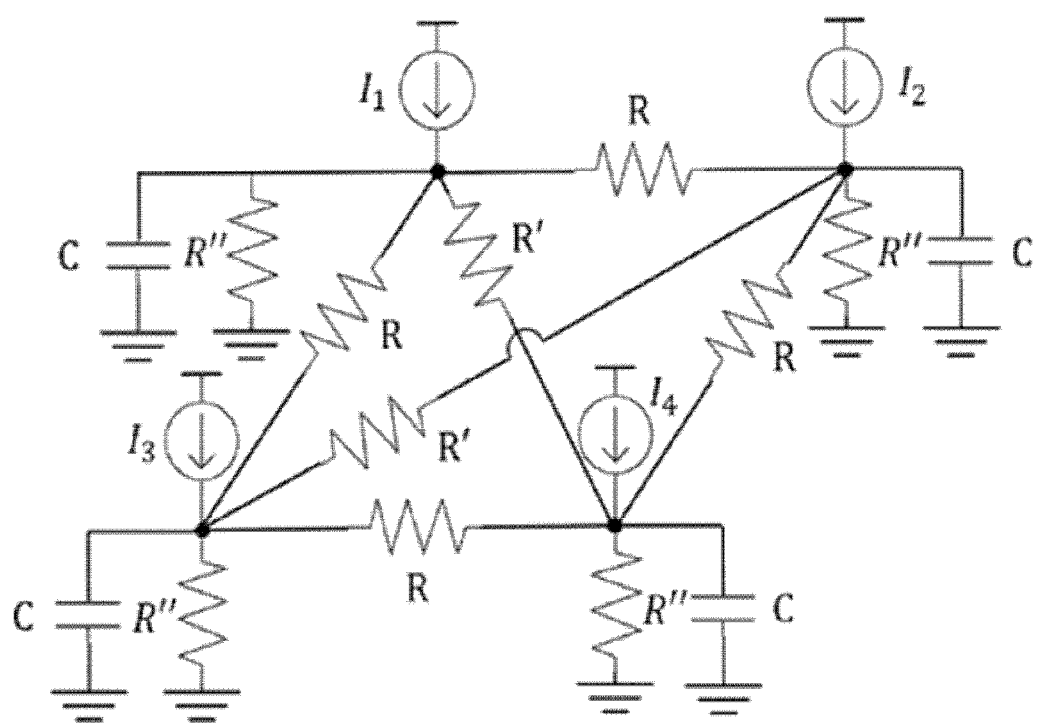
FIG. 3 is a diagram provided to explain a multicore heating analysis model in which a multicore microprocessor is simplified with heating points corresponding in number to cores according to an embodiment of the present disclosure.

FIG. 3 is a diagram provided to explain a multicore heating analysis model in which a multicore microprocessor is simplified with heating points corresponding in number to cores according to an embodiment of the present disclosure.

Referring to FIG. 3, the multicore heating analysis model according to an embodiment of the present disclosure may be established on the assumption that the cores 210 of the microprocessor 200 are respective heating points identical in number with the cores 210.

Specifically, it can be understood that $l_1$ to $l_4$ illustrated as independent current generators in FIG. 3 model power consumed by the respective cores, resistances R and R' model thermal conductances from each core to its adjacent cores, R'' models a thermal conductance to air or ambient conditions, and a capacitor C models a thermal capacitance of the microprocessor.

The relationship among the parameters of the multicore heating analysis model illustrated in FIG. 3 can be represented by the following Equation 3.

$$C\dot{t}_k = P(t_k) + KT_{amb} - (G+K)t_k \quad \text{[Equation 3]}$$

Herein, G can be represented by an n×n matrix which is the reciprocal of the resistances R and R' which are thermal conductances from each core to its adjacent cores, K can be represented by an n×n matrix which is the reciprocal of the resistance R'' which is the thermal conductance to air or ambient conditions, $T_{amb}$ represents an ambient temperature, $P(t_k)$ represents power consumed by a core depending on an operating frequency $f_k$, a processor utilization $u_k$ and a current temperature $t_k$.

Also, in a steady state, Equation 3 can be simplified to the following Equation 4.

$$T_{chip} = \frac{P(t_k) + KT_{amb}}{G + K} \quad \text{[Equation 4]}$$

Specifically, $T_{chip}$ is a temperature of the microprocessor 200 or a temperature of each core 210 in the steady state, the $P(t_k)$ can be calculated by the following Equation 5 with a power consumption look up table depending on the operating frequency $f_k$, and the processor utilization $u_k$ and the current temperature $t_k$.

$$P_k = u_k \times P_{act}(f_k) + P_{oth}(f_k) + P_{leak}(T_k) \quad \text{[Equation 5]}$$

Herein, $u_k \times P_{act}(f_k)$ represents power consumption from the total power consumption depending on a processor utilization and an operating frequency of each core, $P_{oth}(f_k)$ represents power consumption not depending on a processor utilization of each core, but depending only on an operating frequency of each core, and $P_{leak}(T_k)$ represents power consumption to be changed by a leakage current that varies depending on temperature.

FIG. 4A shows an example of a power consumption look up table depending on an operating frequency of a microprocessor according to an embodiment of the present disclosure.

Referring to FIG. 4A, values of $P_{act}(f_k)$ and $P_{oth}(f_k)$ depending on the operating frequency $f_k$ of a core can be obtained and then can be substituted in Equation 5 to calculate a value of $P_k$.

Figure 4B:
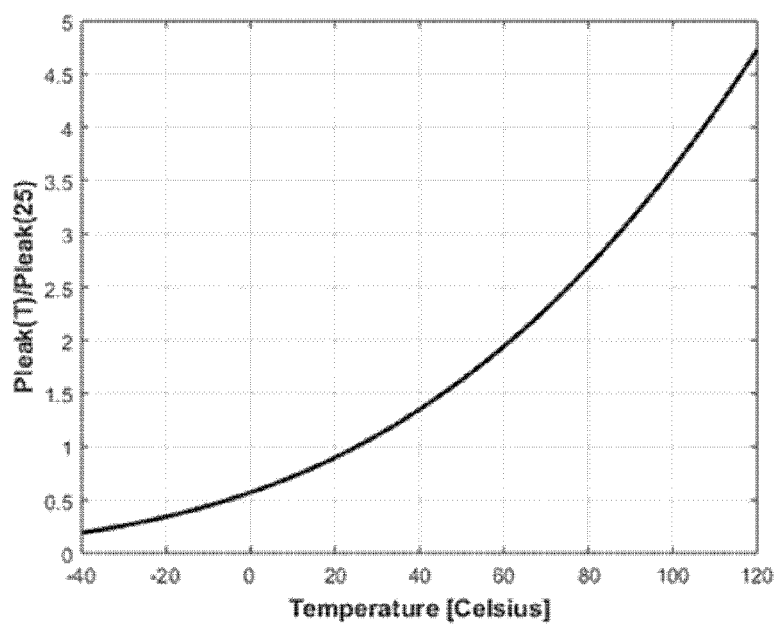
FIG. 4B is a graph showing a change in power consumption caused by a change in leakage current depending on temperature according to an embodiment of the present disclosure.

FIG. 4B is a graph showing a change in power consumption caused by a change in leakage current depending on temperature according to an embodiment of the present disclosure. Referring to FIG. 4B, the power consumption to be changed by a leakage current that varies depending on temperature can be obtained.

Referring to FIG. 4B, it can be seen that $P_{leak}(T_k)$ which represents power consumption to be changed by a leakage current increases as temperature increases. On the graph showing a change in power consumption in FIG. 4B, the horizontal axis represents temperature and the vertical axis a ratio of the power consumption $P_{leak}(T_k)$ caused by a leakage current at a certain temperature to the power consumption $P_{leak}(25)$ caused by a leakage current at 25° C. (i.e., assumed as 1). For example, referring to FIG. 4B, a value of leak $P_{leak}(T_k)$ at 100° C. is about 3.6 times higher than a value of $P_{leak}(T_k)$ at 25° C. That is, even when a core is operated at the same processor utilization u and the same operating frequency f, the power consumption $P_{leak}(T_k)$ caused by a leakage current increases as temperature increases, and, thus, the total power consumption increases.

In most of conventional methods for controlling the temperature of a microprocessor, only a reduction in the maximum temperature (peak temperature) of a microprocessor chip has been considered. However, in these methods for reducing the maximum temperature (peak temperature), the maximum temperature (peak temperature) of a semiconductor and thermal cycling (TC)-related damage affected by the amplitude and cycle of TC cannot be reduced. Thus, it has been difficult to achieve a desired level of improvement in system life.

Unlike the conventional methods for controlling the maximum temperature, the thermal cycling reliability improving apparatus 100 according to an embodiment of the present disclosure can reduce the amplitude of thermal cycling to maximize a mean time to failure of the microprocessor 200. That is, it is necessary to control the minimum temperature to be maintained at a predetermined level or more while reducing the maximum temperature (peak temperature) in order to reduce the amplitude of thermal cycling, and in this regard, the thermal cycling reliability improving apparatus 100 according to an embodiment of the present disclosure can determine an optimal temperature of the microprocessor 200 as the minimum temperature to be maintained at a predetermined level or more. Herein, the optimal temperature may also be referred to as lowest limit temperature, minimum temperature, lowest temperature, or the like. Further, the determining of the optimal temperature by the thermal cycling reliability improving apparatus 100 can be understood as determining an optimal temperature profile having a range of the optimal temperature or more determined with consideration for various limitations. An algorithm for determining an optimal temperature or an optimal temperature profile will be described later in more detail.

If the optimal temperature is determined, the thermal cycling reliability improving apparatus 100 may increase at least one of an operating frequency f of the microprocessor 200 or a processor utilization u of the microprocessor 200 to make a temperature of the microprocessor 200 equal to or higher than the optimal temperature.

Hereinafter, the flow of detailed operations of the thermal cycling reliability improving apparatus 100 will be described.

First, the thermal cycling reliability improving apparatus 100 can acquire a next task set $TaskSet_{i+1}$ including multiple tasks to be performed in a microprocessor.

Then, the thermal cycling reliability improving apparatus 100 may determine a next mapping policy $MappingPolicy_{i+1}$ that minimizes a temperature standard deviation between the cores 210 of the microprocessor 200 based on the next task set $TaskSet_{i+1}$.

Herein, the next mapping policy $MappingPolicy_{i+1}$ may include assignment policy information by which each of the multiple tasks is assigned to each core 210 and next operating frequency information for each core 210 that will perform an assigned task.

That is, the determining of the next mapping policy $MappingPolicy_{i+1}$ by the thermal cycling reliability improving apparatus 100 can be understood as determining the information (assignment policy information) on which core 210 preforms each of the multiple tasks included in the next task set $TaskSet_{i+1}$, and an operating frequency for each of the cores 210 when the core 210 performs an assigned task according to the assignment policy information.

Hereinafter, the flow of detailed operations for determining the next mapping policy $MappingPolicy_{i+1}$ by the thermal cycling reliability improving apparatus 100 will be described.

According to an embodiment of the present disclosure, the thermal cycling reliability improving apparatus 100 may (a) assign any one of the multiple tasks to any one of multiple cores.

Also, the thermal cycling reliability improving apparatus 100 may (b) determine next operating frequency information $f_{i+1}$ for the core that has been assigned the any one task based on a real-time limitation and a power minimization condition. Herein, the next operating frequency information $f_{i+1}$ can be determined by the following Equation 6 based on the real-time limitation and the power minimization condition.

$$f_{i+1} = \min\left\{f \mid f \in F, f \geq \frac{ex_i \times f_i}{l}\right\} \quad \text{[Equation 6]}$$

Herein, $f_{i+1}$ represents next operating frequency information, F represents a set of operating frequencies that can be output, $ex_i$ represents execution time for current task, $f_i$ represents a current operating frequency, and l represents the cycle of a task.

Further, the thermal cycling reliability improving apparatus 100 may (c) calculate temperatures of all the cores. Herein, the temperatures of the respective cores can be calculated by Equation 4.

Furthermore, the thermal cycling reliability improving apparatus 100 may (d) calculate a temperature standard deviation between cores based on the calculated temperatures of all the cores. Herein, the standard deviation is a measure of dispersion of sample data and commonly used in statistics. Since it is obvious to a person with ordinary skill in the art, a detailed description thereof will be omitted.

Besides, the thermal cycling reliability improving apparatus 100 may (e) repeat the processes (a) to (d) with respect to the other cores among the multiple cores for the any one task.

Also, the thermal cycling reliability improving apparatus 100 may (f) determine the assignment policy information in order for a core that minimizes the temperature standard deviation between cores to perform the any one task. That is, the thermal cycling reliability improving apparatus 100 may determine the assignment policy information by which the temperatures of the respective cores can be distributed evenly.

Further, the thermal cycling reliability improving apparatus 100 may repeat the above-described processes (a) to (f) until assignment policy information for all of the multiple tasks and the next operating frequency information for all of the cores are determined.

Also, according to an embodiment of the present disclosure, the thermal cycling reliability improving apparatus 100 may repeat the above-described processes (a) to (f) from a task with the longest execution time to a task with the shortest execution time among the multiple tasks. To this end, the thermal cycling reliability improving apparatus 100 may operate to arrange the multiple tasks included in the next task set TaskSet$_{i+1}$ in descending order of task execution time before the process (a). That is, the thermal cycling reliability improving apparatus 100 may operate to determine assignment policy information by which a task with the longest execution time is assigned to any core, and if the assignment policy information for the task is determined, the thermal cycling reliability improving apparatus 100 may operate to determine assignment policy information for a task with shorter execution time in sequence.

Further, the thermal cycling reliability improving apparatus 100 may calculate an initial temperature $T_{start}$ of the microprocessor 200 based on the determined next mapping policy MappingPolicy$_{i+1}$. Herein, the initial temperature $T_{start}$ may be determined in the form of a vector by estimating temperatures of the respective cores during operation of the cores according to Equation 4 based on the next mapping policy MappingPolicy$_{i+1}$ or may be determined by aggregating the temperatures of the respective cores.

According to an embodiment of the present disclosure, the thermal cycling reliability improving apparatus 100 may be implemented to perform the above-described next mapping policy and initial temperature determining process (i.e., initial mapping process) at each point where the printed circuit board 300 has the highest temperature. Detailed operations of the above-described next mapping policy determining process (initial mapping process) of the thermal cycling reliability improving apparatus 100 will be described later in detail with reference to FIG. 11.

Figure 5:
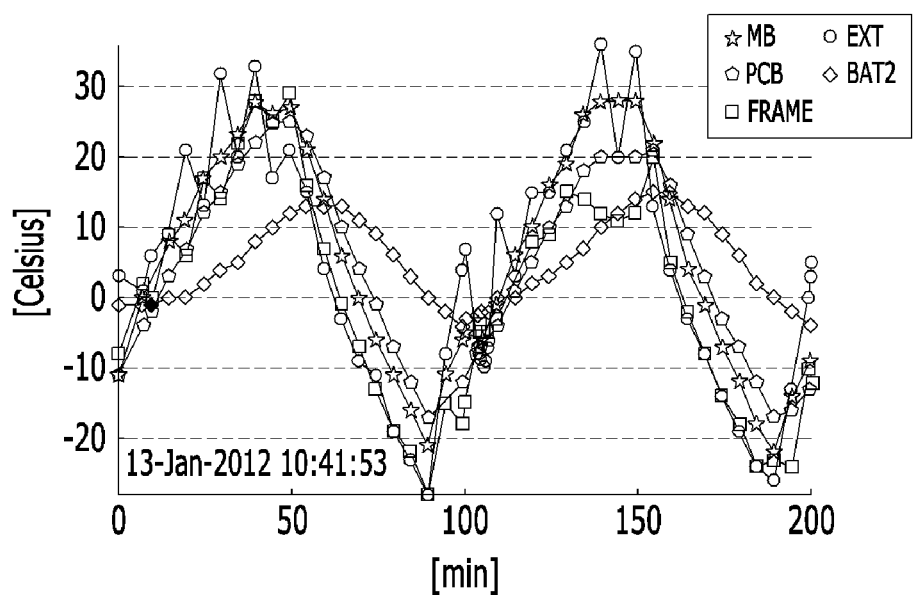
FIG. 5 is a graph showing a change in temperature depending on movement of a system with a built-in satellite payload.

FIG. 5 is a graph showing a change in temperature depending on movement of a system with a built-in satellite payload.

Referring to FIG. 5, a satellite equipped with the system with a built-in satellite payload according to an embodiment of the present disclosure may be, e.g., low earth orbit (LEO) swiss cube satellite. The satellite has a cycle of about 98 minutes and orbits around the earth about fifteen times in a single day. Further, referring to FIG. 5, it can be seen that the temperature of the printed circuit board 300 within the satellite changes greatly from 30° C. to −25° C. for a single cycle. The above-described points where the printed circuit board 300 has the highest temperature are approximately 49-minute point and 147-minute point.

Furthermore, the thermal cycling reliability improving apparatus 100 may determine an optimal temperature profile $T_{opt}$ of the microprocessor 200 based on the initial temperature $T_{start}$ and a minimum operating temperature $T_{min-min}$ and a maximum operating temperature $T_{min-max}$ of the microprocessor 200.

Hereinafter, the flow of detailed operations for determining the optimal temperature profile $T_{opt}$ by the thermal cycling reliability improving apparatus 100 will be described.

The minimum operating temperature $T_{min-max}$ of the microprocessor 200 may be a temperature when the microprocessor 200 performs only a cyclic task at a point where the printed circuit board 300 has the lowest temperature. According to an embodiment of the present disclosure, the minimum operating temperature $T_{min-max}$ can be calculated by Equation 4 based on the lowest temperature of the printed circuit board 300.

The maximum operating temperature $T_{min-max}$ of the microprocessor 200 may be a temperature when all the cores of the microprocessor 200 are operated at the maximum processor utilization (u=1.0) and the maximum operating frequency (f=2.32 GHz in FIG. 5) at a point where the printed circuit board 300 has the lowest temperature. According to an embodiment of the present disclosure, the maximum operating temperature $T_{min-max}$ can be calculated by Equation 4 based on the lowest temperature of the printed circuit board 300.

The thermal cycling reliability improving apparatus 100 may determine a minimum temperature profile $T_{envope-min}$ based on the initial temperature $T_{start}$ and the minimum operating temperature $T_{min-max}$ of the microprocessor 200. Herein, the minimum temperature profile may be described as $T_{low}$ for convenience in description. Herein, $T_{low}$ can be determined specifically by the following Equation 7.

$$T_{envelope-min}(t) = \frac{T_{start} - T_{min-min}}{2}\cos\left(\frac{2\pi t}{Period}\right) + \frac{T_{start} - T_{min-min}}{2} \quad \text{[Equation 7]}$$

The thermal cycling reliability improving apparatus 100 may determine a maximum temperature profile $T_{envope-max}$ based on the initial temperature $T_{st1rt}$ and the maximum operating temperature $T_{min-max}$ of the microprocessor 200. Herein, the maximum temperature profile may be described as $T_{high}$ for convenience in description. Herein, $T_{high}$ can be determined specifically by the following Equation 8.

$$T_{envelope-max}(t) = \frac{T_{start} - T_{min-max}}{2}\cos\left(\frac{2\pi t}{Period}\right) + \frac{T_{start} - T_{min-max}}{2} \quad \text{[Equation 8]}$$

Then, the thermal cycling reliability improving apparatus 100 may determine the optimal temperature profile $T_{opt}$ at which the mean time to failure of the microprocessor 200 is maximized within a range between the minimum temperature profile $T_{low}$ and the maximum temperature profile $T_{high}$ by using a binary search algorithm.

In this regard, the thermal cycling reliability improving apparatus 100 may calculate the mean time to failure of the microprocessor 200 based on a Monte Carlo simulator. Herein, the Monte Carlo may be a simulator that calculates each of a mean time to failure MTTF$_{EM}$ with consideration for Electromigration (EM), a mean time to failure MTTF$_{TDDB}$ with consideration for Time-dependent dielectric breakdown (TDDB), a mean time to failure MTTF$_{SM}$ with consideration for Stress migration (SM) and a mean time to failure MTTF$_{TC}$ with consideration for Thermal Cycling (TC) and aggregates them by probability calculation to calculate a mean time to failure MTTF of the microprocessor 200.

Specifically, the mean time to failure MTTF$_{EM}$ with consideration for Electromigration (EM) is related to a phenomenon in which when a current flows at interconnects of a semiconductor system, an atom collides with moving electrons and momentum is transferred, and, thus, the metal atom breaks away. While moving to the ends of the interconnects, the atom may cause a failure by increasing a resistance of a conductive line or causing a line disconnection. MTTF$_{EM}$ can be calculated by the following Equation 9-1.

$$MTTF_{EM} = \frac{A_{EM}}{J^n} e^{\frac{E_{a,EM}}{kT}} \quad \text{[Equation 9-1]}$$

Herein, $A_{EM}$ is the constant determined by metal interconnect, J is the current density, $E_{a,EM}$ is activation energy, n is the constant determined heuristically, k is the Boltzmann constant and T is a temperature.

Further, the mean time to failure $MTTF_{TDDB}$ with consideration for Time-dependent dielectric breakdown (TDDB) is related to damage caused by gradual wear of a dielectric. A gate current caused by high-temperature electrons in a transistor may cause a failure in the dielectric, and, thus, a transistor may be damaged permanently. $MTTF_{TDDB}$ can be calculated by the following Equation 9-2.

$$MTTF_{TDDB} = A_{TDDB} \left(\frac{1}{V}\right)^{(a-bT)} e^{\frac{X+Y/T+ZT}{kT}} \quad \text{[Equation 9-2]}$$

Herein, $A_{TDDB}$ is a constant, V is a supply voltage, a, b, X, Y, Z are the parameters controlled heuristically, k is the Boltzmann constant and T is a temperature.

Furthermore, the mean time to failure $MTTF_{SM}$ with consideration for Stress migration (SM) is related to a phenomenon in which a metal atom breaks away as described above with reference to $MTTF_{EM}$. Particularly, the mean time to failure $MTTF_{SM}$ is related to a breakaway of the metal atom caused by mechanical stress due to coefficients of thermal expansions between a metal and a dielectric adjacent to each other at interconnects. $MTTF_{SM}$ can be calculated by the following Equation 9-3.

$$MTTF_{SM} = A_{SM} |T_0 - T|^{-n} e^{\frac{E_{a,SM}}{kT}} \quad \text{[Equation 9-3]}$$

Herein, $A_{SM}$ is a constant, $T_0$ is the temperature of metal without stress, T is the temperature of metal, $E_{a,SM}$ is activation energy, n is the constant determined heuristically and k is the Boltzmann constant.

Moreover, the mean time to failure $MTTF_{TC}$ with consideration for Thermal Cycling (TC) is related to wear caused by thermal stress that is generated when adjacent materials have different coefficients of thermal expansions. Particularly, the thermal cycling reliability improving apparatus 100 of the present disclosure focuses on reducing damage caused by thermal cycling. $MTTF_{TC}$ can be calculated by the following Equation 9-4.

$$MTTF_{TC} = \frac{T}{\sum_{i=0}^{N_m-1} \frac{1}{N_{ci}}} \quad \text{[Equation 9-4]}$$

Herein, $N_m$ is the number of thermal cycling at a cycle T and $N_{ci}$ is the characteristic of an ith thermal cycling. Particularly, this can be calculated by a modified Coffin-Manson equation as shown in the following Equation 9-5.

$$N_c = A_{TC}(\Delta T - \Delta T_0)^{-b} e^{\frac{E_{a,TC}}{kT_{max}}} \quad \text{[Equation 9-5]}$$

Herein, $A_{TC}$ is a constant, $\Delta T$ is the amplitude of thermal cycling, $\Delta T_0$ is the temperature at which an inelastic material starts to be damaged, b is the Coffin-Mason exponent constant depending on a characteristic of a material, $E_{a,SM}$ is activation energy, n is the constant determined heuristically and k is the Boltzmann constant.

According to an embodiment of the present disclosure, the mean time to failure MTTF can be calculated by year. Further, a mean time to failure can be represented by $MTTF_1$ when the microprocessor 200 is operated based on the maximum temperature profile $T_{high}$ and by $MTTF_3$ when the microprocessor 200 is operated based on the minimum temperature profile $T_{low}$.

Also, the thermal cycling reliability improving apparatus 100 may determine an intermediate temperature profile $T_{mid}$ based on the mean temperature of the minimum operating temperature $T_{min-min}$ and the maximum operating temperature $T_{min-max}$ in order to determine the optimal temperature profile $T_{opt}$. The intermediate temperature profile $T_{mid}$ may be an initial value assumed as the optimal temperature profile $T_{opt}$ by the above-described binary search algorithm. In this case, a mean time to failure can be represented by $MTTF_2$ when the microprocessor 200 is operated based on the intermediate temperature profile $T_{mid}$.

Figure 6:
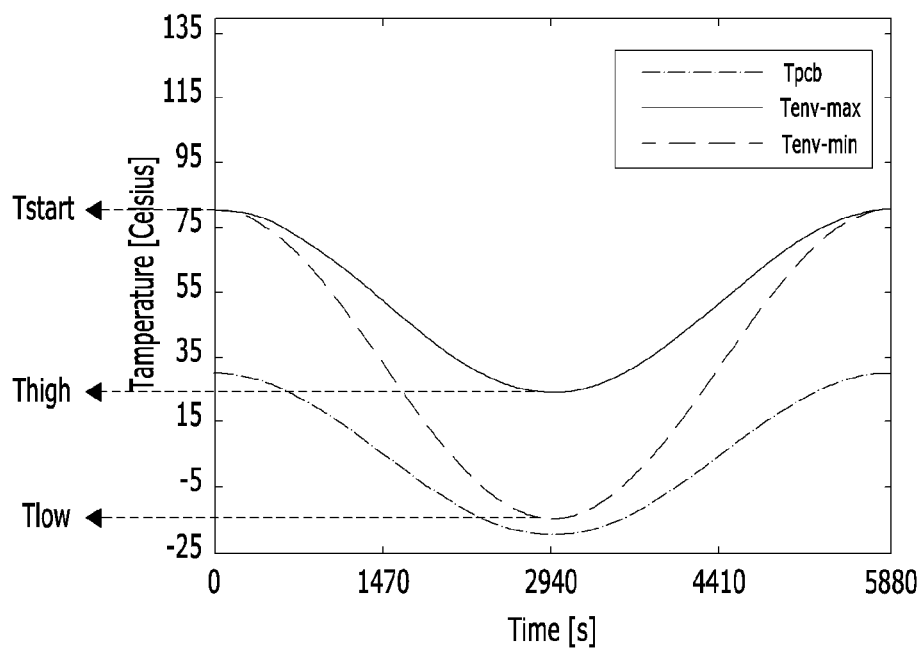
FIG. 6 is a graph showing the shape and range of temperature profile according to an embodiment of the present disclosure.

FIG. 6 is a graph showing the shape and range of temperature profile according to an embodiment of the present disclosure.

Referring to FIG. 6, a solid blue line indicates a temperature profile of the printed circuit board 300, a solid red line indicates the maximum temperature profile $T_{high}$ and a dotted red line indicates the minimum temperature profile $T_{low}$. It can be seen that the optimal temperature profile $T_{opt}$ can be determined between the solid red line and the dotted red line and the minimum temperature profile $T_{low}$ and the maximum temperature profile $T_{high}$ start from the initial temperature $T_{start}$ determined in the above-described initial mapping process.

A process for determining the optimal temperature profile $T_{opt}$ based on the binary search algorithm is as follows.

First, if $MTTF_1$ is greater than $MTTF_3$ by comparing $MTTF_1$ with $MTTF_3$, $T_{low}$ is set to $T_{mid}$ and $MTTF_3$ is set to $MTTF_2$ and a new $T_{mid}$ is calculated by $T_{mid}=(T_{high}+T_{low})/2$ and then $MTTF_2$ is calculated again. In this case, if $|T_{high}-T_{mid}|>1$ is satisfied, $MTTF_1$ is compared again with $MTTF_3$. If the inequation is not satisfied, the search is ended and a temperature profile corresponding to the greater one of $MTTF_1$ and $MTTF_2$ is determined as the optimal temperature profile $T_{opt}$.

If $MTTF_1$ is smaller than $MTTF_3$, $T_{high}$ is set to $T_{mid}$ and $MTTF_1$ is set to $MTTF_2$ and a new $T_{mid}$ is calculated by $T_{mid}=(T_{high}+T_{low})/2$ and then $MTTF_2$ is calculated again. In this case, if $\oplus T_{min}-T_{mid}>1$ is satisfied, $MTTF_1$ is compared again with $MTTF_3$. If the inequation is not satisfied, the search is ended and a temperature profile corresponding to the greater one of $MTTF_3$ and $MTTF_2$ is determined as the optimal temperature profile $T_{opt}$.

To sum up, the thermal cycling reliability improving apparatus 100 compares first $MTTF_1$ corresponding to the maximum temperature profile $T_{high}$ with $MTTF_3$ corresponding to the minimum temperature profile $T_{low}$, and if a mean time to failure corresponding to any one of the temperature profiles is greater, the optimal temperature profile $T_{opt}$ can be expected to be determined near the corresponding temperature profile. Therefore, a mean time to failure is repeatedly compared with each other by renewing the intermediate temperature profile $T_{mid}$ to approach a temperature profile with a greater mean time to failure. Thus, it is possible to determined (detect) the optimal temperature profile $T_{opt}$ with a maximum mean time to failure.

According to an embodiment of the present disclosure, the thermal cycling reliability improving apparatus 100 may be implemented to perform the above-described optimal temperature profile determining process one time per cycle of the satellite after the above-described initial mapping process is ended.

That is, the initial mapping process and the optimal temperature profile determining process may be sequentially performed at a point where the printed circuit board 300 has the highest temperature in every cycle of the satellite. Therefore, it can be understood that a temperature profile which the microprocessor 200 needs to follow is determined during a cycle (period from a point with the highest temperature of the printed circuit board to a next point with the highest temperature of the printed circuit board).

Also, the thermal cycling reliability improving apparatus 100 may adjust at least one of the operating frequency f for each core 210 of the microprocessor 200 or the processor utilization u of the microprocessor 200 to make a difference between the optimal temperature profile $T_{opt}$ and the temperature $T_{chip}$ of the microprocessor 200 equal to or lower than a predetermined threshold value.

Specifically, the thermal cycling reliability improving apparatus 100 can calculate a difference between the optimal temperature profile and the temperature of the microprocessor. In this case, the temperature $T_{chip}$ of the microprocessor 200 can be calculated by Equation 4.

Further, if a calculated temperature difference $T_{diff}$ is higher than a predetermined threshold value $T_{threshold}$, the thermal cycling reliability improving apparatus 100 can increase at least one of the operating frequency f of each core 210 of the microprocessor 200 or the processor utilization u of the microprocessor 200. In this case, if the thermal cycling reliability improving apparatus 100 increases the processor utilization u of the microprocessor 200, an idle task (virtual task) is assigned to a core 210 that is to increase the processor utilization u.

Specifically, the thermal cycling reliability improving apparatus 100 controls the temperature difference $T_{diff}$ to be equal to or lower than the predetermined threshold value $T_{threshold}$ by increasing at least one of the operating frequency f of each core 210 or the processor utilization u of the microprocessor 200. If the thermal cycling reliability improving apparatus 100 increases only the operating frequency f, the assigned task is ended faster, and, thus, the processor utilization u may decrease. Therefore, the thermal cycling reliability improving apparatus 100 may assign another idle task (virtual task) to the core to increase the processor utilization u. To put it simply, if the temperature of the microprocessor 200 decreases by a predetermined amount or more to be equal to or lower than the threshold value, the thermal cycling reliability improving apparatus 100 additionally assigns another task that does not need to be processed immediately by the microprocessor 200, heat generation is induced while the task is processed. As a result, the amplitude of a thermal cycling shape of the microprocessor 200 can be reduced and the mean time to failure can be improved.

Also, according to an embodiment of the present disclosure, the thermal cycling reliability improving apparatus 100 may be implemented to perform a process (i.e., runtime mapping process) for adjusting at least one of the operating frequency f of each core 210 or the processor utilization u of the microprocessor 200 in every execution cycle that is determined based on a cycle of a task included in the above-described next task set $TaskSet_{i+1}$. For example, the thermal cycling reliability improving apparatus 100 may determine the minimum cycle among cycles of the multiple tasks as the execution cycle.

Figure 7:
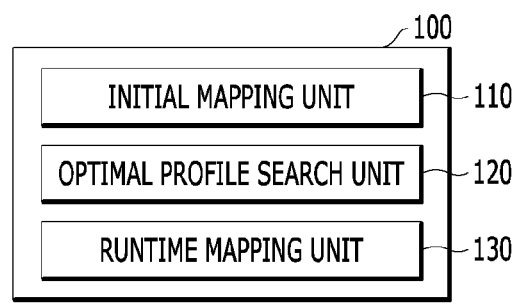
FIG. 7 is a schematic diagram illustrating the configuration of the apparatus for improving the thermal cycling reliability of a multicore microprocessor according to an embodiment of the present disclosure.

FIG. 7 is a schematic diagram illustrating the configuration of an apparatus for improving the thermal cycling reliability of a multicore microprocessor according to an embodiment of the present disclosure.

Referring to FIG. 7, the thermal cycling reliability improving apparatus 100 of a multicore microprocessor according to an embodiment of the present disclosure may include an initial mapping unit 110, an optimal profile search unit 120 and a runtime mapping unit 130.

The initial mapping unit 110 may determine a next mapping policy $MappingPolicy_{i+1}$ on multiple tasks to be performed by the microprocessor 200 and output an initial temperature $T_{start}$ of the microprocessor 200 based on the next mapping policy $MappingPolicy_{i+1}$.

Specifically, according to an embodiment of the present disclosure, the initial mapping unit 110 may perform (a) assigning any one of the multiple tasks to any one of multiple cores, (b) determining next operating frequency information for the core that has been assigned the any one task based on a real-time limitation and a power minimization condition, (c) calculating temperatures of all the cores, (d) calculating a temperature standard deviation between cores based on the calculated temperatures of all the cores, (e) repeating the processes (a) to (d) with respect to the other cores among the multiple cores for the any one task, (f) determining assignment policy information in order for a core that minimizes the temperature standard deviation between cores to perform the any one task, and (g) repeating the processes (a) to (f) until the assignment policy information for all of the multiple tasks and the next operating frequency information for all of the cores are determined.

The optimal profile search unit 120 may determine an optimal temperature profile $T_{opt}$ of the microprocessor 200 based on the initial temperature $T_{start}$ and a minimum operating temperature $T_{min-min}$ and a maximum operating temperature $T_{min-max}$ of the microprocessor 200.

Figure 8:
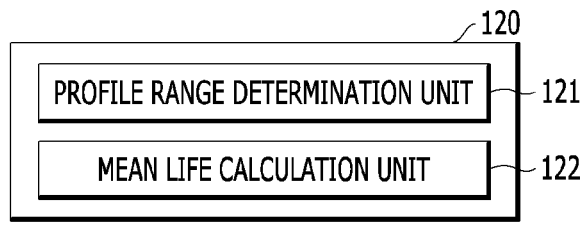
FIG. 8 is a schematic diagram illustrating the configuration of an optimal route search unit according to an embodiment of the present disclosure.

FIG. 8 is a schematic diagram illustrating the configuration of an optimal route search unit according to an embodiment of the present disclosure.

Referring to FIG. 8, the optimal profile search unit 120 may include a profile range determination unit 121 and a mean life calculation unit 122.

The profile range determination unit 121 may determine the minimum temperature profile $T_{low}$ based on the minimum operating temperature $T_{min-min}$ and the initial temperature $T_{start}$ and may also determine the maximum temperature profile $T_{high}$ based on the maximum operating temperature $T_{min-max}$ and the initial temperature $T_{start}$.

The mean life calculation unit 122 may determine the optimal temperature profile $T_{opt}$ within a range between the minimum temperature profile $T_{ow}$ and the maximum temperature profile $T_{high}$ based on the mean time to failure MTTF.

The runtime mapping unit 130 may adjusts at least one of an operating frequency f for each core of the microprocessor 200 or a processor utilization u of the microprocessor 200 based on a difference $T_{diff}$ between the optimal temperature profile $T_{opt}$ and a temperature $T_{chip}$ of the microprocessor 200.

Figure 9:
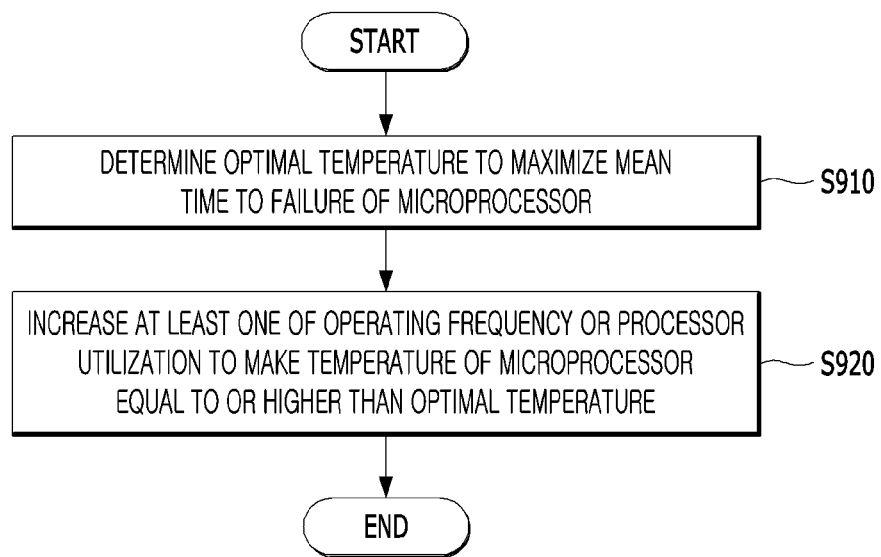
FIG. 9 is a flowchart schematically showing operations of a method for improving thermal cycling reliability of a multicore microprocessor according to an embodiment of the present disclosure.

FIG. 9 is a flowchart schematically showing operations of a method for improving thermal cycling reliability of a multicore microprocessor according to an embodiment of the present disclosure.

The method for improving thermal cycling reliability of a multicore microprocessor illustrated in FIG. 9 can be performed by the above-described the thermal cycling reliability improving apparatus 100 of the multicore microprocessor. Therefore, the descriptions of the thermal cycling reliability improving apparatus 100 of the multicore microprocessor may be identically applied to the method for improving thermal cycling reliability of the multicore microprocessor, even though they are omitted hereinafter.

Referring to FIG. 9, in process S910, the thermal cycling reliability improving apparatus 100 may determine an optimal temperature of the microprocessor 200 to maximize a mean time to failure of the microprocessor 200.

Then, in process S920, the thermal cycling reliability improving apparatus 100 may increase at least one of an operating frequency f of the microprocessor 200 or a processor utilization u of the microprocessor 200 to make a temperature of the microprocessor 200 equal to or higher than the optimal temperature.

In the descriptions above, the processes S910 to S920 may be divided into additional processes or combined into fewer processes depending on an exemplary embodiment. In addition, some of the processes may be omitted and the sequence of the processes may be changed if necessary.

Figure 10:
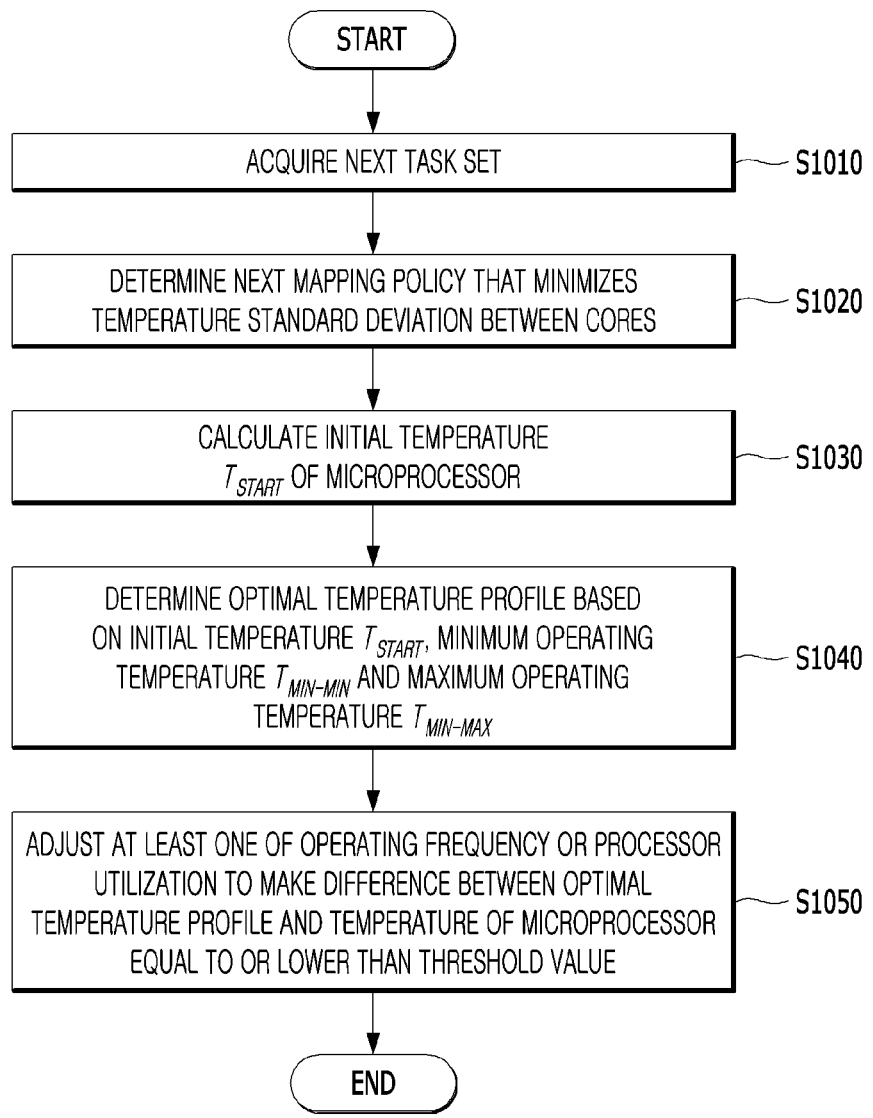
FIG. 10 is a flowchart showing detailed operations of the method for improving thermal cycling reliability of a multicore microprocessor according to an embodiment of the present disclosure.

FIG. 10 is a flowchart showing detailed operations of the method for improving thermal cycling reliability of a multicore microprocessor according to an embodiment of the present disclosure.

The method for improving thermal cycling reliability of a multicore microprocessor illustrated in FIG. 10 can be performed by the above-described the thermal cycling reliability improving apparatus 100 of the multicore microprocessor. Therefore, the descriptions of the thermal cycling reliability improving apparatus 100 of the multicore microprocessor may be identically applied to the method for improving thermal cycling reliability of the multicore microprocessor, even though they are omitted hereinafter.

Referring to FIG. 10, in process S1010, the initial mapping unit 110 may acquire (receive) the next task set $TaskSet_{i+1}$ including multiple tasks to be performed in the microprocessor 200.

Then, in process S1020, the initial mapping unit 110 may determine the next mapping policy $MappingPolicy_{i+1}$ that minimizes a temperature standard deviation between the cores 210 of the microprocessor 200 based on the next task set $TaskSet_{i+1}$.

Then, in process S1030, the initial mapping unit 110 may calculate the initial temperature $T_{start}$ of the microprocessor 200 based on the determined next mapping policy $MappingPolicy_{i+1}$.

Then, in process S1040, the optimal profile search unit 120 may determine the optimal temperature profile $T_{opt}$ for the microprocessor 200 based on the initial temperature $T_{start}$ and the minimum operating temperature $T_{min-min}$ and the maximum operating temperature $T_{min-max}$ of the microprocessor 200.

Then, in process S1050, the runtime mapping unit 130 may adjust at least one of the operating frequency f for each core of the microprocessor 200 or the processor utilization u of the microprocessor 200 to make the difference $T_{diff}$ between the optimal temperature profile $T_{opt}$ and a temperature of the microprocessor 200 equal to or lower than a predetermined threshold value $T_{threshold}$.

In the descriptions above, the processes S1010 to S1050 may be divided into additional processes or combined into fewer processes depending on an exemplary embodiment. In addition, some of the processes may be omitted and the sequence of the processes may be changed if necessary.

Figure 11:
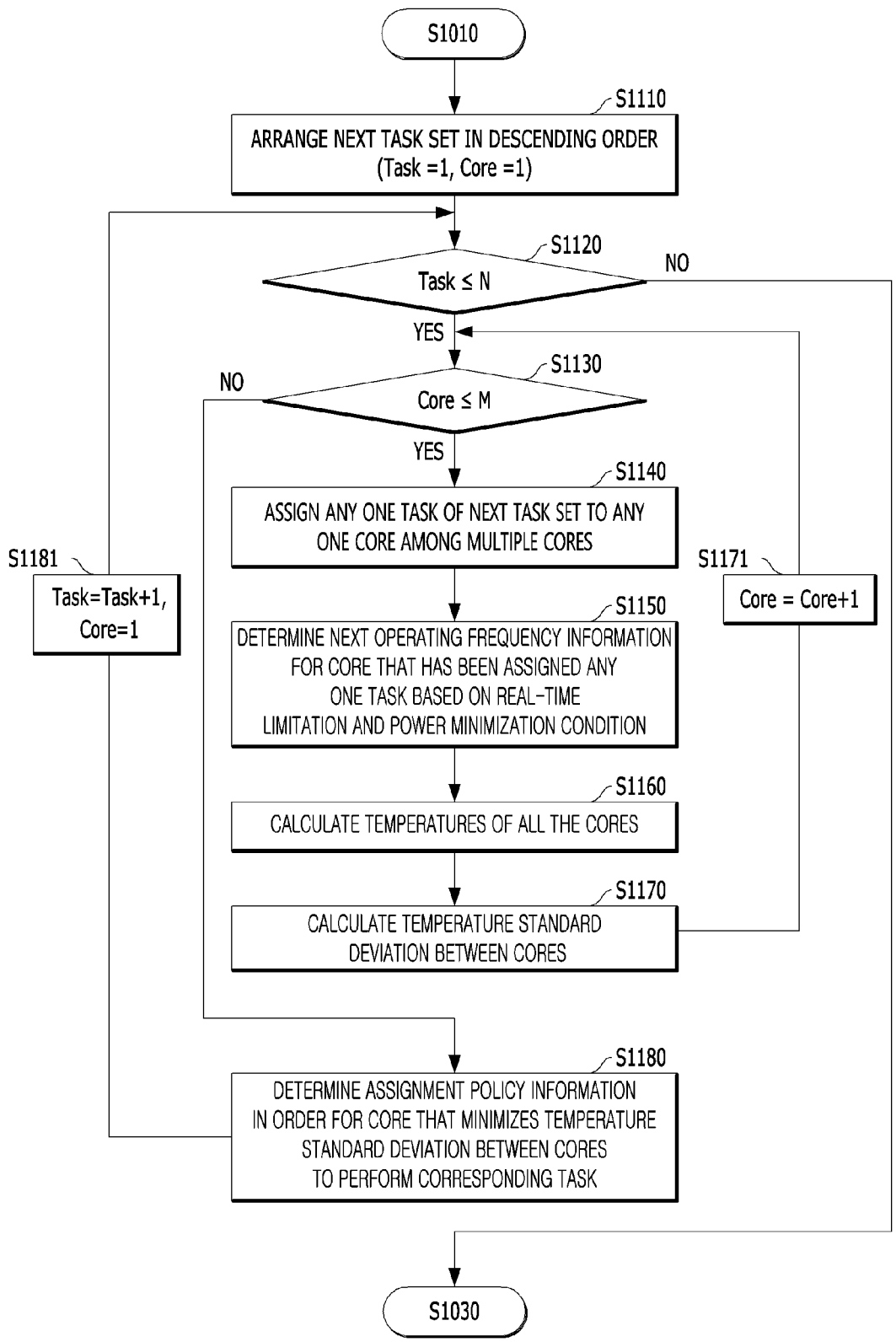
FIG. 11 is a flowchart showing detailed operations of an initial mapping process according to an embodiment of the present disclosure.

FIG. 11 is a flowchart showing detailed operations of an initial mapping process according to an embodiment of the present disclosure.

The operations of the initial mapping process illustrated in FIG. 11 can be performed by the above-described the thermal cycling reliability improving apparatus 100 of the multicore microprocessor. Therefore, the descriptions of the thermal cycling reliability improving apparatus 100 of the multicore microprocessor may be identically applied to the operations of the initial mapping process illustrated in FIG. 11, even though they are omitted hereinafter.

Referring to FIG. 11, in process S1110, the initial mapping unit 110 may arrange the next task set $TaskSet_{i+1}$ in descending order. Herein, the arrangement in descending order means that the multiple tasks included in the next task set $TaskSet_{i+1}$ are arranged in order of execution time, from longest to shortest. Also, according to an embodiment of the present disclosure, if the next task set $TaskSet_{i+1}$ includes N number of tasks, a task with the longest execution time may become the first task (Task=1) and a task with the shortest execution time may become the Nth task (Task=N) in sequential order. In this regard, after process S1120, the initial mapping unit 110 assigns each of the tasks from the first task to the Nth task in sequence to any one of the multiple cores.

Then, in process S1120, the initial mapping unit 110 checks an identification number Task of a task to be currently assigned, and if the Task number is equal to lower than N that is the number of all tasks (YES), the initial mapping unit 110 assigns the corresponding task. If the Task number is higher than N (NO), the initial mapping unit 110 determines that all tasks included in the next task set $TaskSet_{i+1}$ have been assigned and proceeds to the above-described process S1030.

Then, in process S1130, the initial mapping unit 110 checks an identification number Core of a core to be assigned a task, and if the Core number is equal to lower than M that is the number of all cores (YES), the initial mapping unit 110 assigns a task to the corresponding core. If the Core number is higher than M (NO), the initial mapping unit 110 determines that all cases of assigning the corresponding task to each of the cores have been considered and proceeds to process S1180 to determine a core to perform the corresponding task.

Then, in process S1140, the initial mapping unit 110 may assign any one task (corresponding to the current Task identification number) to any one core (corresponding to the current Core identification number) among the multiple cores.

Then, in process S1150, the initial mapping unit 110 may determine next operating frequency information $f_{i+1}$ for the core that has been assigned the any one task based on a real-time limitation and a power minimization condition.

Then, in process S1160, if any one core (corresponding to the current Core identification number) among the multiple cores is assigned any one task (corresponding to the current Task identification number), the initial mapping unit 110 may calculate temperatures of all the cores with consideration for heat generated by the core when the core performs the task.

Then, in process S1170, the initial mapping unit 110 may calculate a temperature standard deviation between cores based on the temperatures of all the cores calculated in process S1170.

Then, in process S1171, the initial mapping unit 110 returns to process S1130 to perform process 1140 to process 1170 for the case where 1 is added to the core identification number Core and the task is assigned to a next core.

At the time of entering process S1180, the initial mapping unit 110 has acquired the result of calculating the temperature standard deviation between cores for the case where any one task (corresponding to the current Task identification number) to each of the multiple cores. In process S1180, the initial mapping unit 110 may determine assignment policy information in order for a core that minimizes the temperature standard deviation between cores to perform the corresponding task. That is, in process 1180, any one task (corresponding to the current Task identification number) is completely assigned to a specific core.

Then, in process S1181, the initial mapping unit 110 may return to process S1120 to determine an assignment policy and an operating frequency of a next task for the case where 1 is added to the task identification number Task.

In the descriptions above, the processes S1110 to S1181 may be divided into additional processes or combined into fewer processes depending on an exemplary embodiment. In addition, some of the processes may be omitted and the sequence of the processes may be changed if necessary.

Figure 12:
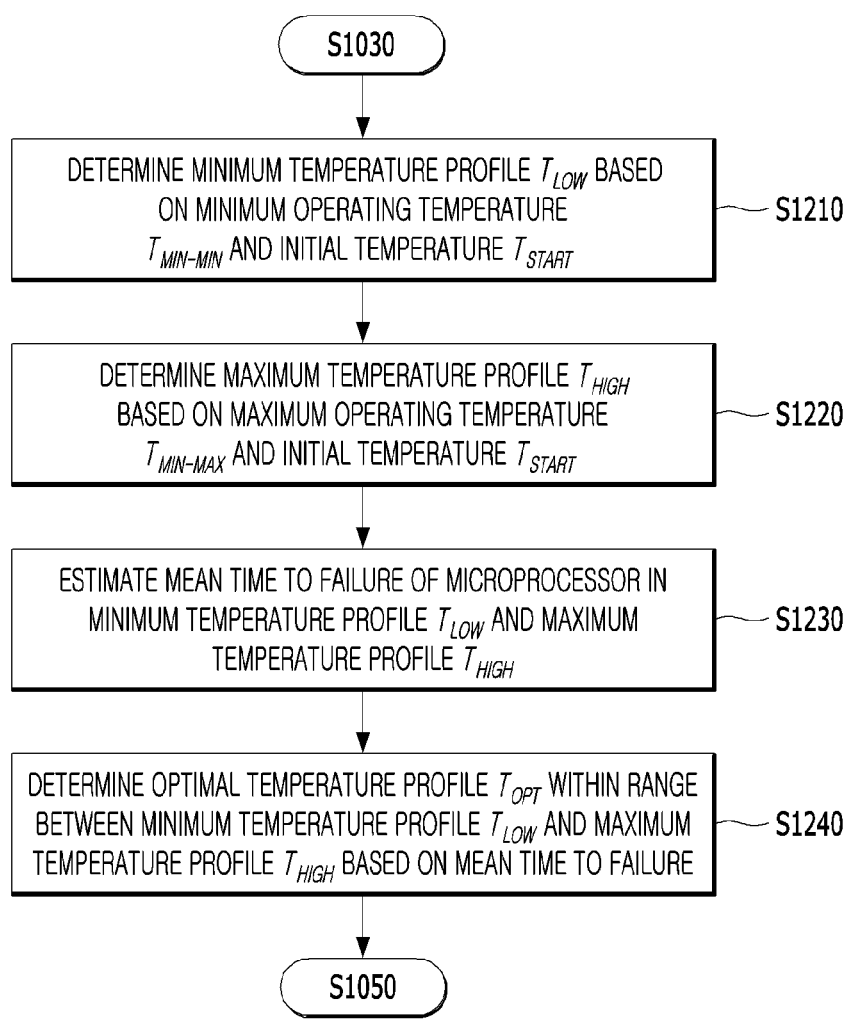
FIG. 12 is a flowchart showing detailed operations of an optimal temperature profile determining process according to an embodiment of the present disclosure.

FIG. 12 is a flowchart showing detailed operations of an optimal temperature profile determining process according to an embodiment of the present disclosure.

The operations of the optimal temperature profile determining process illustrated in FIG. 12 can be performed by the above-described the thermal cycling reliability improving apparatus 100 of the multicore microprocessor. Therefore, the descriptions of the thermal cycling reliability improving apparatus 100 of the multicore microprocessor may be identically applied to the operations of the optimal temperature profile determining process illustrated in FIG. 12, even though they are omitted hereinafter.

Referring to FIG. 12, in process S1210, the profile range determination unit 121 may determine the minimum temperature profile $T_{low}$ based on the minimum operating temperature $T_{min-min}$ and the initial temperature $T_{start}$.

Then, in process S1220, the profile range determination unit 121 may determine the maximum temperature profile $T_{high}$ based on the maximum operating temperature $T_{min-max}$ and the initial temperature $T_{start}$.

Then, in process S1230, the mean life calculation unit 122 may estimate the mean time to failure MTTF of the microprocessor 200 in the minimum temperature profile $T_{low}$ and the maximum temperature profile $T_{high}$.

Then, in process S1240, the mean life calculation unit 122 may determine the optimal temperature profile $T_{opt}$ within a range between the minimum temperature profile $T_{low}$ and the maximum temperature profile $T_{high}$ based on the mean time to failure MTTF.

In the descriptions above, the processes S1210 to S1240 may be divided into additional processes or combined into fewer processes depending on an exemplary embodiment. In addition, some of the processes may be omitted and the sequence of the processes may be changed if necessary.

Figure 13:
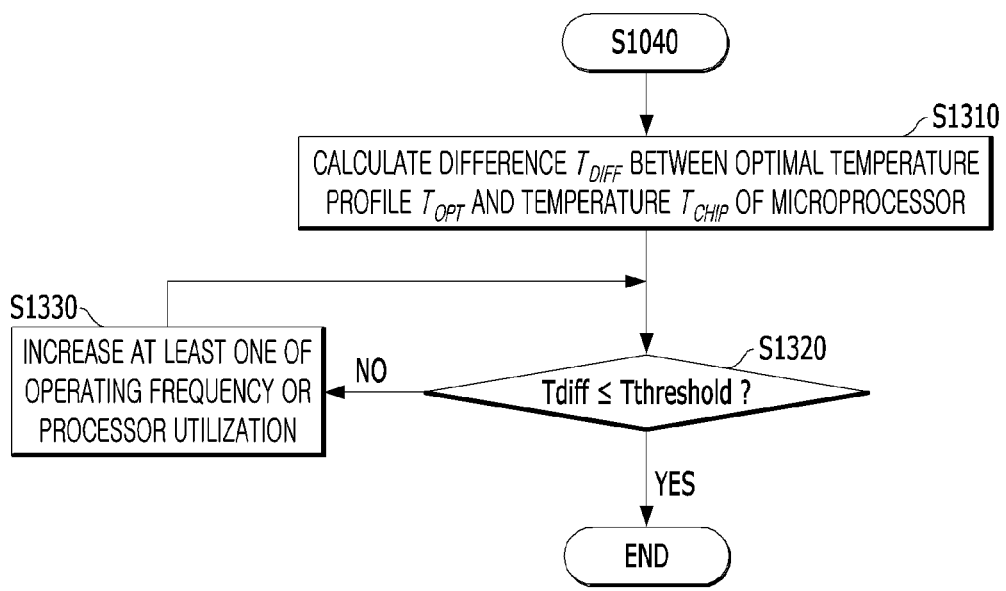
FIG. 13 is a flowchart showing detailed operations of a runtime mapping process according to an embodiment of the present disclosure.

FIG. 13 is a flowchart showing detailed operations of a runtime mapping process according to an embodiment of the present disclosure.

The operations of the runtime mapping process illustrated in FIG. 13 can be performed by the above-described the thermal cycling reliability improving apparatus 100 of the multicore microprocessor. Therefore, the descriptions of the thermal cycling reliability improving apparatus 100 of the multicore microprocessor may be identically applied to the operations of the runtime mapping process illustrated in FIG. 13, even though they are omitted hereinafter.

Referring to FIG. 13, in process S1310, the runtime mapping unit 130 may calculate the difference $T_{diff}$ between the optimal temperature profile $T_{opt}$ determined by the optimal profile search unit 120 and the temperature $T_{chip}$ of the microprocessor 200.

Then, in process S1320, the runtime mapping unit 130 may compare the temperature difference $T_{diff}$ calculated in process S1310 with the predetermined threshold value $T_{threshold}$. If the temperature difference $T_{diff}$ is lower than or equal to the predetermined threshold value $T_{threshold}$, it is determined that the microprocessor is expected to be operated at a temperature near the determined optimal temperature profile $T_{opt}$ by a predetermined level or more, and, thus, the runtime mapping process may be ended. However, if the temperature difference $T_{diff}$ is higher than the predetermined threshold value $T_{threshold}$, it is determined that the microprocessor is expected to be operated at a temperature different from the determined optimal temperature profile $T_{opt}$ by a predetermined level or more, and, thus, the runtime mapping unit 130 may proceed to process S1330 to control the microprocess to be operated at a temperature near the optimal temperature profile $T_{opt}$.

Then, in process S1330, if the temperature difference $T_{diff}$ is higher than the predetermined threshold value $T_{threshold}$, the runtime mapping unit 130 may increase at least one of the operating frequency f for each core of the microprocessor 200 or the processor utilization u of the microprocessor 200.

In the descriptions above, the processes S1310 to S1330 may be divided into additional processes or combined into fewer processes depending on an exemplary embodiment. In addition, some of the processes may be omitted and the sequence of the processes may be changed if necessary.

The method for improving thermal cycling reliability of a multicore microprocessor according to an embodiment of the present disclosure may be implemented in an executable program command form by various computer means and be recorded in a computer-readable storage medium. The computer-readable storage medium may include a program command, a data file, and a data structure individually or a combination thereof. The program command recorded in the computer-readable storage medium may be specially designed or configured for the present disclosure or may be known to a person with ordinary skill in a computer software field to be used. Examples of the computer-readable storage medium include magnetic media such as hard disk, floppy disk, or magnetic tape, optical media such as CD-ROM or DVD, magneto-optical media such as floptical disk, and a hardware device such as ROM, RAM, flash memory specially configured to store and execute program commands. Examples of the program command include a machine language code created by a complier and a high-level language code executable by a computer using an interpreter. The hardware device may be configured to be operated as at least one software module to perform an operation of the present disclosure, and vice versa.

Further, the above-described method for improving thermal cycling reliability of a multicore microprocessor may be implemented as a computer program or application stored in a storage medium and executed by a computer.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

1: Microprocessor system
100: Thermal cycling reliability improving apparatus of multicore microprocessor
110: Initial mapping unit
120: Optimal profile search unit
121: Profile range determination unit
122: Mean life calculation unit
130: Runtime mapping unit
200: Microprocessor
210: Core
220: Temperature sensor
300: Printed circuit board

We claim:

1. A method for improving thermal cycling reliability of a multicore microprocessor, performed by a thermal cycling reliability improving apparatus of the multicore microprocessor, comprising:
   determining a next mapping policy based on a next task set including multiple tasks to be performed in the microprocessors;
   determining an optimal temperature of the microprocessor to maximize a mean time to failure of the microprocessor based on the next mapping policy; and
   based on a temperature of the microprocessor being lower than the optimal temperature, increasing at least one of an operating frequency of the microprocessor or a processor utilization of the microprocessor to make the temperature of the microprocessor be equal to or higher than the optimal temperature,
   wherein the next mapping policy includes assignment policy information by which each of the multiple tasks is assigned to each of cores of the microprocessor and next operating frequency information for each of the cores that will perform an assigned task.

2. A method for improving thermal cycling reliability of a multicore microprocessor, performed by a thermal cycling reliability improving apparatus of the multicore microprocessor, comprising:
   acquiring a next task set including multiple tasks to be performed in the microprocessor;
   determining a next mapping policy that minimizes a temperature standard deviation between cores of the microprocessor based on the next task set;
   calculating an initial temperature of the microprocessor based on the determined next mapping policy;
   determining an optimal temperature profile for the microprocessor based on the initial temperature, a minimum operating temperature and a maximum operating temperature of the microprocessor; and
   adjusting at least one of an operating frequency for each of the cores of the microprocessor or a processor utilization of the microprocessor to make a difference between the optimal temperature profile and a temperature of the microprocessor be equal to or lower than a predetermined threshold value,
   wherein the next mapping policy includes assignment policy information by which each of the multiple tasks is assigned to each of the cores and next operating frequency information for each of the cores that will perform an assigned task, and
   wherein the adjusting of the at least one of the operating frequency or the processor utilization comprises increasing the at least one of the operating frequency for each of the cores or the processor utilization of the microprocessor when the difference between the optimal temperature profile and the temperature of the microprocessor becomes higher than the predetermined threshold value according to decrease of the temperature of the microprocessor.

3. The method for improving thermal cycling reliability of a multicore microprocessor of claim 2,
   wherein the determining of the next mapping policy includes:
   (a) assigning any one of the multiple tasks to any one of the cores;
   (b) determining the next operating frequency information for the core that has been assigned the any one task based on a real-time limitation and a power minimization condition;
   (c) calculating temperatures of all the cores;
   (d) calculating a temperature standard deviation between cores based on the calculated temperatures of all the cores;
   (e) repeating the processes (a) to (d) with respect to the other cores among the cores for the any one task; and
   (f) determining the assignment policy information in order for a core that minimizes the temperature standard deviation between cores to perform the any one task.

4. The method for improving thermal cycling reliability of a multicore microprocessor of claim 3,
   wherein the determining of the next mapping policy is performed repeatedly until the assignment policy information for all of the multiple tasks and the next operating frequency information for all of the cores are determined.

5. The method for improving thermal cycling reliability of a multicore microprocessor of claim 4,
   wherein the determining of the next mapping policy is performed repeatedly from a task with the longest execution time to a task with the shortest execution time among the multiple tasks.

6. The method for improving thermal cycling reliability of a multicore microprocessor of claim 2,
   wherein the determining of the optimal temperature profile includes:
   determining a minimum temperature profile based on the minimum operating temperature and the initial temperature;
   determining a maximum temperature profile based on the maximum operating temperature and the initial temperature;
   estimating a mean time to failure of the microprocessor in the minimum temperature profile and the maximum temperature profile; and
   determining the optimal temperature profile within a range between the minimum temperature profile and the maximum temperature profile based on the mean time to failure.

7. The method for improving thermal cycling reliability of a multicore microprocessor of claim 6,
wherein in the estimating of the mean time to failure, the mean time to failure is estimated based on a Monte Carlo simulator.

8. The method for improving thermal cycling reliability of a multicore microprocessor of claim 2,
wherein the adjusting of at least one of the operating frequency for each of the cores of the microprocessor or the processor utilization of the microprocessor includes:
calculating the difference between the optimal temperature profile and the temperature of the microprocessor.

9. The method for improving thermal cycling reliability of a multicore microprocessor of claim 8,
wherein in the increasing of at least one of the operating frequency for each of the cores of the microprocessor or the processor utilization of the microprocessor, a virtual task is assigned to a core that will increase a processor utilization to increase the processor utilization of the microprocessor.

10. The method for improving thermal cycling reliability of a multicore microprocessor of claim 2,
wherein the microprocessor and a printed circuit board on which the microprocessor is mounted are provided in a system with a built-in satellite payload.

11. An apparatus for improving thermal cycling reliability of a multicore microprocessor, comprising:
an initial mapping unit that determines a next mapping policy for multiple tasks to be performed in the microprocessor and outputs an initial temperature of the microprocessor based on the next mapping policy;
an optimal profile search unit that determines an optimal temperature profile based on the initial temperature, a minimum operating temperature and a maximum operating temperature of the microprocessor; and
a runtime mapping unit that adjusts at least one of an operating frequency for each of cores of the microprocessor or a processor utilization of the microprocessor based on a difference between the optimal temperature profile and a temperature of the microprocessor,
wherein the next mapping policy includes assignment policy information by which each of the multiple tasks is assigned to each of the cores and next operating frequency information for each of the cores that will perform an assigned task, and
wherein the runtime mapping unit increases the at least one of the operating frequency or the processor utilization of the microprocessor to make the difference be equal to or less than a predetermined threshold value when the difference between the optimal temperature profile and the temperature of the microprocessor becomes higher than the predetermined threshold value according to decrease of the temperature of the microprocessor.

12. The apparatus for improving thermal cycling reliability of a multicore microprocessor of claim 11,
wherein the initial mapping unit performs:
(a) assigning any one of the multiple tasks to any one of the cores;
(b) determining the next operating frequency information for the core that has been assigned the any one task based on a real-time limitation and a power minimization condition;
(c) calculating temperatures of all the cores;
(d) calculating a temperature standard deviation between cores based on the calculated temperatures of all the cores;
(e) repeating the processes (a) to (d) with respect to the other cores among the cores for the any one task;
(f) determining the assignment policy information in order for a core that minimizes the temperature standard deviation between cores to perform the any one task; and
(g) repeating the processes (a) to (f) until the assignment policy information for all of the multiple tasks and the next operating frequency information for all of the cores are determined.

13. The apparatus for improving thermal cycling reliability of a multicore microprocessor of claim 11,
wherein the optimal profile search unit includes:
a profile range determination unit that determines a minimum temperature profile based on the minimum operating temperature and the initial temperature and determines a maximum temperature profile based on the maximum operating temperature and the initial temperature; and
a mean life calculation unit that determines the optimal temperature profile within a range between the minimum temperature profile and the maximum temperature profile based on a mean time to failure of the microprocessor.

14. The apparatus for improving thermal cycling reliability of a multicore microprocessor of claim 11,
wherein the runtime mapping unit calculates the difference between the optimal temperature profile and the temperature of the microprocessor.

* * * * *